(12) United States Patent
Liu et al.

(10) Patent No.: US 12,443,858 B2
(45) Date of Patent: Oct. 14, 2025

(54) TRAINING METHOD AND SYSTEM FOR PASSENGER DISTRIBUTION PREDICTION MODEL, AND PASSENGER GUIDING METHOD AND SYSTEM

(71) Applicant: CENTRAL SOUTH UNIVERSITY, Hunan (CN)

(72) Inventors: Hui Liu, Hunan (CN); Zhu Duan, Hunan (CN); Jin Qin, Hunan (CN); Haiping Wu, Hunan (CN); Shi Yin, Hunan (CN); Chao Chen, Hunan (CN)

(73) Assignee: Central South University, Changsha (CN)

( * ) Notice: Subject to any disclaimer, the term of this patent is extended or adjusted under 35 U.S.C. 154(b) by 765 days.

(21) Appl. No.: 17/776,585

(22) PCT Filed: May 19, 2021

(86) PCT No.: PCT/CN2021/094495
§ 371 (c)(1),
(2) Date: May 12, 2022

(87) PCT Pub. No.: WO2022/062432
PCT Pub. Date: Mar. 31, 2022

(65) Prior Publication Data
US 2022/0391717 A1    Dec. 8, 2022

(30) Foreign Application Priority Data

Sep. 27, 2020    (CN) .......................... 202011029942.4

(51) Int. Cl.
*G06N 5/022*    (2023.01)
*G06Q 50/40*    (2024.01)
*G06T 7/10*     (2017.01)

(52) U.S. Cl.
CPC ............. *G06N 5/022* (2013.01); *G06Q 50/40* (2024.01); *G06T 7/10* (2017.01); *G06T 2207/20021* (2013.01)

(58) Field of Classification Search
CPC .......... G06N 3/044; G06N 3/08; G06N 5/022; G06N 3/0442; G06N 3/09; G06N 20/00;
(Continued)

(56) References Cited

U.S. PATENT DOCUMENTS 6,941,013 B1 * 9/2005 Drayer ................. G06T 3/4007
382/176

FOREIGN PATENT DOCUMENTS

| CN | 107244330 A |   | 10/2017 |   |           |
|----|-------------|---|---------|---|-----------|
| CN | 109684952 A | * | 4/2019  | ..| G06K 9/00771 |

(Continued)

OTHER PUBLICATIONS

Candanedo, Luis M., and Véronique Feldheim. "Accurate occupancy detection of an office room from light, temperature, humidity and CO2 measurements using statistical learning models." Energy and buildings 112 (2016): 28-39. (Year: 2016).*

(Continued)

*Primary Examiner* — Lisa M Caputo
*Assistant Examiner* — Carter W Ferrell
(74) *Attorney, Agent, or Firm* — MASCHOFF BRENNAN; Michael Mauriel; Elaine Lee (57) ABSTRACT

The present invention discloses a method and system for training a passenger distribution prediction model, and a method and system for guiding passengers. In an embodiment, the passenger distribution is intelligently sensed by means of the characteristics of temperature, humidity and $CO_2$ concentration distribution changes in cars caused by passenger density changes, which avoids the problems of crowd flow and obscuration faced by passenger distribution (Continued)

detection conducted with images, and avoids the difficulty in floor intrusive transformation faced by passenger distribution detection conducted with pressure sensors; the passenger flow is guided by adjusting the brightness of lighting tubes in the cars, for example, the lighting tubes in areas with high passenger density are dimmed, and the lighting tubes in areas with low passenger density are brightened, to guide ordered flow of passengers toward areas with low passenger density. Further details are disclosed herein.

21 Claims, 2 Drawing Sheets

(58) Field of Classification Search
CPC ........ G06Q 50/40; G06Q 50/26; G06V 20/59; G06V 20/53; G06F 16/55; G06F 17/18; G06F 16/2474; G06F 18/214; G06F 18/24; G06F 16/5846; G06F 16/5854; G06F 16/5862; G06F 16/50; G06F 16/5838; G06T 7/10; G06T 2207/20021; G06T 2207/20081; G06T 11/001; Y02T 30/00; G01D 21/02; B61L 15/009; B61B 1/00

See application file for complete search history.

(56) References Cited

FOREIGN PATENT DOCUMENTS

| | | |
|---|---|---|
| CN | 109815882 A | 5/2019 |
| CN | 110281979 A | 9/2019 |
| CN | 110543985 A | 12/2019 |
| CN | 112184523 A | 1/2021 |
| WO | 2014/121328 A1 | 8/2014 |

OTHER PUBLICATIONS

Jang, Junyoung, et al. "Subway passenger distribution system by using CO2 concentrations data." Proceedings of the 6th International Conference on the Internet of Things. 2016. (Year: 2016).*

* cited by examiner

—— Lighting tube  ▒▒▒ Lighting area  ══ Screen door  ▨▨▨ Seating area  ⌐ ⌐ Independent unit corresponding to pixel

FIG. 3

TRAINING METHOD AND SYSTEM FOR PASSENGER DISTRIBUTION PREDICTION MODEL, AND PASSENGER GUIDING METHOD AND SYSTEM

CROSS REFERENCE TO RELATED APPLICATIONS

This application is a U.S. National Phase application under 35 U.S.C. § 371 of International Application No. PCT/CN2021/094495 filed on May 19, 2021 and claims priority to Chinese Application No. 202011029942.4 filed on Sep. 27, 2020. The entire contents of these applications are hereby incorporated herein by reference.

FIELD OF THE INVENTION

The present invention belongs to the technical field of urban rail transit operation, and particularly relates to a training method and system for a distribution prediction model of passengers in a subway car, and a method and a system for guiding passengers in a subway car based on environmental monitoring and lighting guidance.

BACKGROUND OF THE INVENTION

With the continuous development of China's rail transit system, the improvement on the operational service level of the rail transit system has become an important force to promote the development of urban rail transit. When taking the subway, passengers lack objective perception of the congestion condition in different areas of cars, resulting in some overcrowded areas and some empty areas, which seriously affects the space utilization of subway cars and the passenger experience. Therefore, it is necessary to detect the degree of passenger gathering in the cars and on the platforms in real time and guide passengers to flow to places not crowded, so as to improve the utilization of subway space. A system and a method for guiding subway passengers include two key technologies: passenger density information acquisition and guidance information release. Currently, the passenger density information acquisition is mainly based on an image detection or pressure sensor detection method. With regard to the image detection method, the passenger density detection ability cannot be guaranteed in cases of crowd flow, obscuration, etc. With regard to the pressure sensor detection method, the installation of pressure sensors requires invasive reconstruction of the entire ground of the subway, for example, the patent application with the publication No. CN110281979A proposed a method of detecting the density of passengers in a subway car by installing piezoelectric sensors on the floor of a subway car.

Currently, the passenger guidance system and method mainly use voice prompts or display prompts, for example, the patent with the Announcement No. CN107244330B proposed a method of guiding passengers to flow in order by installing isolation fences in subway cars and providing voice prompt information. However, the voice prompts are difficult to be heard in a noisy travel condition, and the display prompts are difficult to get the attention of passengers.

SUMMARY OF THE INVENTION

The objective of the present invention is to provide a training method and system for a passenger distribution prediction model, and a method and a system for guiding passengers, so as to solve the problem that the passenger density detection ability cannot be guaranteed in cases of crowd flow and obscuration, the problem that the detection of passenger density with piezoelectric sensors requires invasive reconstruction, and the problem that the voice prompts are poorly targeted and the display prompts are difficult to get the attention of passengers.

In the first aspect, the present invention provides a training method for a distribution prediction model of passengers in a subway car, including:

establishing a spatial coordinate system of each car, installing collection devices constituted by temperature and humidity sensors and a $CO_2$ concentration sensor in each car, each collection device serving as a sample collection point, and obtaining installation coordinates of each sample collection point in the corresponding spatial coordinate system, wherein the spatial coordinate system is a two-dimensional rectangular coordinate system parallel to the roof or the ground of the car, or the spatial coordinate system is a two-dimensional rectangular coordinate system coincident with the roof or the ground;

obtaining a temperature time series, a humidity time series, and a $CO_2$ concentration time series at each sample collection point of each car during a sampling period, and obtaining an average temperature value and an average humidity value locally of the day, wherein the installation coordinates of each sample collection point, the temperature time series, the humidity time series, and the $CO_2$ concentration time series corresponding to the sample collection point, and the average temperature value and the average humidity value constitute an environmental data sample at each sample collection point of each car during the sampling period;

recording passenger positions in each car at an end time of the sampling period, and obtaining coordinates of passengers in the corresponding spatial coordinate system, i.e. obtaining a passenger distribution for each car during the sampling period;

converting the passenger distribution for each car during the sampling period into a binary image, and calculating a mean value, a variance, a maximum value and a minimum value of pixels in the binary image;

calculating an amplitude and a gradient direction of each pixel in the binary image, and establishing a frequency distribution histogram with the gradient direction of all pixels as the abscissa axis and the pixel value corresponding to each pixel as the ordinate axis; extracting a frequency distribution feature of the frequency distribution histogram, the frequency distribution feature referring to a feature vector constituted by pixel values corresponding to each interval among R intervals equally divided from the abscissa axis of the frequency distribution histogram;

combining the mean value, the maximum value, the minimum value, the variance and frequency distribution feature of the pixels to form an original feature vector, and clustering the binary images with the original feature vector as an input of a clustering algorithm to obtain image clustering results; coding the passenger distribution mode according to the image clustering results to obtain a passenger distribution code, and each category of image clustering result corresponding to a passenger distribution mode, and each passenger distribution mode corresponding to a passenger distribution code; and establishing a distribution prediction model for each car, and training the distribution prediction model with training samples to obtain a trained distribution prediction model, the training sample taking the environmental data sample at each sample collection point of each car during the sampling period as input and the corresponding passenger distribution code as output.

In the present invention, the passenger distribution is intelligently sensed by means of the temperature, humidity and $CO_2$ concentration distribution changes in cars caused by passenger density changes, which avoids the problems of crowd flow and obscuration faced by passenger distribution detection method conducted with images, and avoids the shortcoming in floor intrusive reconstruction faced by passenger distribution detection method conducted with pressure sensors; the passenger distribution data in each car is mapped to the spatial coordinate system, and the passenger distribution is described in pixels, which realizes intelligent classification of passenger distribution modes by image clustering, and solves the problems of inaccurate description of passenger distribution modes in cars and inaccurate description of typical distribution modes in cars.

Further, the spatial coordinate system is a two-dimensional rectangular coordinate system with the horizontal centerline of the roof as the x-axis and the longitudinal centerline of the roof as the y-axis, or the spatial coordinate system is a two-dimensional rectangular coordinate system with the horizontal centerline of the ground as the x-axis and the longitudinal centerline of the ground as the y-axis.

Further, 15 collection devices are installed on the roof of each car, and the 15 collection devices are arranged in an array.

Further, the specific process of converting the passenger distribution for each car during the sampling period into a binary image is as follows:
dividing the car into W equal parts along the x-axis of the spatial coordinate system of each car, and dividing the car into L equal parts along the y-axis of the spatial coordinate system of each car, to convert the space of each car into W×L independent units;
setting each independent unit as a pixel, the number of passengers in each independent unit being a pixel value of the pixel; and
obtaining pixel values of all pixels, and converting the passenger distribution into the binary image composed of W×L pixels.

Preferably, L is 3 and W is 10.

Further, formulas for calculating the amplitude and the gradient direction of the pixel are respectively:

$$G(l, w) = \sqrt{G_x(l, w)^2 + G_y(l, w)^2},$$

$$\theta(l, w) = \arctan\frac{G_y(l, w)}{G_x(l, w)}$$

$$G_x(l, w) = I(l+1, w) - I(l-1, w),$$

$$G_y(l, w) = I(l, w+1) - I(l, w-1)$$

Where, $G(l, w)$ is the amplitude of the pixel, $\theta(l, w)$ is the gradient direction of the pixel, $G_x(l, w)$ is the gradient amplitude of the pixel along the x-axis of the spatial coordinate system, $G_y(l, w)$ is the gradient amplitude of the pixel along the y-axis of the spatial coordinate system, $I(l+1, w)$ is the pixel value of the pixel in row l+1 and column w, $I(l-1, w)$ is the pixel value of the pixel in row l-1 and column w, $l=1, 2, 3 \ldots L$, $w=1, 2, 3 \ldots W$, and W is a number of equal parts divided from the car along the x-axis of the spatial coordinate system of each car, and L is a number of equal parts divided from the car along the y-axis of the spatial coordinate system of each car.

Further, the clustering algorithm is an OPTICS algorithm, the initial neighborhood distance parameter e of the OPTICS algorithm is 0.2, and the initial neighborhood sample parameter AMinPts is 3.

The OPTICS algorithm is not sensitive to input parameters, which improves the accuracy of clustering results.

Preferably, the distribution prediction model is any one of a support vector machine model, a relevance vector machine model or a neural network model.

Further, the temperature time series, the humidity time series, and the $CO_2$ concentration time series in the training samples are replaced with a temperature time series feature vector, a humidity time series feature vector, and a $CO_2$ concentration time series feature vector, respectively, wherein the temperature time series feature vector, the humidity time series feature vector, and the $CO_2$ concentration time series feature vector are obtained as follows:
establishing a temperature time series LSTM (Long Short-Term Memory) neural network model, and randomly dividing the temperature time series in the training samples into two temperature training sets, wherein one of the temperature training sets and the passenger distribution code corresponding to the temperature training set constitute a first training set, and the other temperature training set is a second training set; training the temperature time series LSTM neural network model with the first training set to obtain a trained temperature time series LSTM neural network model; removing a classification layer of the trained temperature time series LSTM neural network model, and obtaining the temperature time series feature vector with the second training set as input and a vector outputted by a fully connected layer as output;
establishing a humidity time series LSTM neural network model, and randomly dividing the humidity time series in the training sample into two humidity training sets, wherein one humidity training set and the passenger distribution code corresponding to the humidity training set constitute a third training set, and the other humidity training set is a fourth training set; training the humidity time series LSTM neural network model with the third training set to obtain a trained humidity time series LSTM neural network model; removing a classification layer of the trained humidity time series LSTM neural network model, and obtaining the humidity time series feature vector with the fourth training set as input and a vector outputted by a fully connected layer as output; and
establishing a $CO_2$ concentration time series LSTM neural network model, and randomly dividing the $CO_2$ concentration time series in the training sample into two $CO_2$ concentration training sets, wherein one $CO_2$ concentration training set and the passenger distribution code corresponding to the $CO_2$ concentration training set constitute a fifth training set, and the other $CO_2$ concentration training set is a sixth training set; training the $CO_2$ concentration time series LSTM neural network model with the fifth training set to obtain a trained $CO_2$ concentration time series LSTM neural network model; removing a classification layer of the trained $CO_2$ concentration time series LSTM neural network model, and obtaining the $CO_2$ concentration time series feature vector with the sixth training set as input and a vector outputted by a fully connected layer as output.

The original temperature time series, humidity time series, and $CO_2$ concentration time series have high dimensionality. The corresponding feature vectors are extracted through the LSTM neural network models, which reduces the dimensionality of the feature vectors and reduces the complexity of training and testing.

In a second aspect, the present invention further provides a training system for a distribution prediction model of passengers in a subway car, including a plurality of training subsystems, each car corresponding to a training subsystem, wherein each training subsystem includes a plurality of collection devices arranged on the roof of the car and a control device; the collection device includes temperature and humidity sensors and a $CO_2$ concentration sensor;

the control device includes:
a coordinate system establishment unit, configured to establish a spatial coordinate system of each car, and obtain installation coordinates of each sample collection point in the corresponding spatial coordinate system, each collection device serving as a sample collection point;
an environmental data obtaining unit, configured to obtain a temperature time series, a humidity time series, and a $CO_2$ concentration time series at each sample collection point of each car during a sampling period, and obtain an average temperature value and an average humidity value locally of the day, wherein the installation coordinates of each sample collection point, the temperature time series, the humidity time series, and the $CO_2$ concentration time series corresponding to the sample collection point, and the average temperature value and the average humidity value constitute an environmental data sample at each sample collection point of each car during the sampling period; a passenger distribution obtaining unit, configured to obtain coordinates of passengers in the corresponding spatial coordinate system according to the recorded passenger positions in each car at the end time of the sampling period, i.e. obtain a passenger distribution for each car during the sampling period;
an image conversion and feature extraction unit, configured to convert the passenger distribution for each car during the sampling period into a binary image, and calculate a mean value, a variance, a maximum value and a minimum value of pixels in the binary image; calculate an amplitude and a gradient direction of each pixel in the binary image, and establish a frequency distribution histogram with the gradient direction of all pixels as the abscissa axis and the pixel value corresponding to each pixel as the ordinate axis; and extract a frequency distribution feature of the frequency distribution histogram, the frequency distribution feature referring to a feature vector constituted by pixel values corresponding to each interval among R intervals equally divided from the abscissa axis of the frequency distribution histogram;
a clustering classification unit, configured to combine the mean value, the maximum value, the minimum value, the variance and the frequency distribution feature of the pixels to form an original feature vector, and cluster the binary images with the original feature vector as input of a clustering algorithm to obtain image clustering results;
a coding unit, configured to code the passenger distribution mode according to the image clustering results to obtain a passenger distribution code, each category of image clustering result corresponding to a passenger distribution mode, and each passenger distribution mode corresponding to a passenger distribution code; and
a model training unit, configured to establish a distribution prediction model for each car, and train the distribution prediction model with a training sample to obtain a trained distribution prediction model, the training sample taking the environmental data sample of each sample collection point of each car during the sampling period as input and the corresponding passenger distribution code as output.

In the third aspect, the present invention further provides a method for guiding passengers in a subway car based on environmental monitoring and lighting guidance, including:
obtaining an environmental data sample at each sample collection point of each car during each sampling period in real time, the environmental data sample being constituted by installation coordinates of each sample collection point, a temperature time series, a humidity time series, and a $CO_2$ concentration time series corresponding to the sample collection point, and an average temperature value and an average humidity value;
inputting the environmental data sample into the distribution prediction model for the corresponding car which is trained by the training method in the first aspect, to obtain a predicted passenger distribution code for each car during the corresponding sampling period; and
adjusting the brightness of lighting tubes in the corresponding car according to the predicted passenger distribution code for the car during the corresponding sampling period to guide passenger flow.

The passenger flow is guided by adjusting the brightness of the lighting tubes in the car. For example, the lighting tubes in areas with high passenger density are dimmed, and the lighting tubes in areas with low passenger density are brightened, to guide ordered flow of passengers toward areas with low passenger density (i.e. empty areas), which avoids the noisy environment of the car, and the lighting guidance method has the advantages of simplicity, directness and has high level of public acceptance.

Further, the temperature time series, the humidity time series, and the $CO_2$ concentration time series in the environmental data samples are replaced with a temperature time series feature vector, a humidity time series feature vector, and a $CO_2$ concentration time series feature vector, respectively, wherein the temperature time series feature vector, the humidity time series feature vector, and the $CO_2$ concentration time series feature vector are obtained as follows:
inputting the temperature time series into the trained temperature time series LSTM neural network model with the classification layer removed in the first aspect, the vector outputted by the fully connected layer being the corresponding temperature time series feature vector;
inputting the humidity time series into the trained humidity time series LSTM neural network model with the classification layer removed in the first aspect, the vector outputted by the fully connected layer being the corresponding humidity time series feature vector; and
inputting the $CO_2$ concentration time series into the trained $CO_2$ concentration time series LSTM neural network model with the classification layer removed in the first aspect, the vector outputted by the fully connected layer being the corresponding $CO_2$ concentration time series feature vector. Further, the specific process of controlling the brightness of lighting tubes in the corresponding car according to the predicted passenger distribution code for the car during the corresponding sampling period is as follows:

obtaining a current image clustering result according to the predicted passenger distribution code for the car during the corresponding sampling period, and determining a clustering center corresponding to the current image according to the current image clustering result;

defining S binary images closest to the clustering center as typical clustering images of a corresponding category, and calculating an average pixel value of each pixel position in the S typical clustering images, to obtain an average pixel image under the category;

assigning each lighting tube to a lighting area according to the layout of lighting tubes in the corresponding car, and calculating an average value of pixel values for pixels in the lighting area corresponding to each lighting tube;

if the maximum pixel value in the average pixel image is greater than a pixel threshold, starting lighting guidance and performing the next step, otherwise skipping lighting guidance;

extracting pixels in the average pixel image whose average pixel values are greater than the pixel threshold, the pixels greater than the pixel threshold constituting a set of pixels to be guided;

calculating a lighting guidance coefficient according to the coordinates of the lighting tubes in the spatial coordinate system, the coordinates of pixels in the set of pixels to be guided in the spatial coordinate system, and the average value of pixel values for the pixels in the lighting area, wherein the specific calculation expression is:

$$\beta_n = A_n \left( \sqrt{(x_0^n - x_1^l)^2 + (y_0^n - y_1^w)^2} + \sqrt{(x_0^n - x_2^l)^2 + (y_0^n - y_1^w)^2} + \ldots \right.$$
$$\left. \ldots + \sqrt{(x_0^n - x_H^l)^2 + (y_0^n - y_H^w)^2} \right)$$

where, $\beta_n$ is the lighting guidance coefficient, $A_n$ is the average value of pixel values for pixels in the lighting area corresponding to the $n^{th}$ lighting tube, $(x_0^n, y_0^n)$ is the coordinates of the $n^{th}$ lighting tube in the spatial coordinate system, $(x_1^l, y_1^w)$ is the coordinates of the first pixel in the set of pixels to be guided in the spatial coordinate system, $(x_2^l, y_2^w)$ is the coordinates of the second pixel in the set of pixels to be guided in the spatial coordinate system, $(x_H^l, y_H^w)$ is the coordinates of the $H^{th}$ pixel in the set of pixels to be guided in the spatial coordinate system, and H is the number of pixels in the set of pixels to be guided;

adjusting the brightness of the lighting tubes in the lighting areas corresponding to the $\beta_n$ values according to the order of the $\beta_n$ values, and guiding passengers to flow toward the lighting area with a smaller $\beta_n$ value.

Preferably, the pixel threshold is 15.

In a fourth aspect, the present invention further provides a system for guiding passengers in a subway car based on environmental monitoring and lighting guidance, including:

a real-time data obtaining unit, configured to obtain an environmental data sample at each sample collection point of each car during each sampling period in real time, the environmental data sample being constituted by installation coordinates of each sample collection point, a temperature time series, a humidity time series, and a $CO_2$ concentration time series corresponding to the sample collection point, an average temperature value and an average humidity value;

a prediction unit, configured to input the environmental data sample into the distribution prediction model for the corresponding car which is trained by the training method of the first aspect, to obtain a predicted passenger distribution code for each car during the corresponding sampling period; and an adjustment and guidance unit, configured to adjust the brightness of lighting tubes in the corresponding car according to the predicted passenger distribution code for the car during the corresponding sampling period to guide passenger flow.

Further, the adjustment and guidance unit is specifically configured to:

Obtain a current image clustering result according to the predicted passenger distribution code for the car during the corresponding sampling period, and determine a clustering center corresponding to the current image according to the current image clustering result;

Define S binary images closest to the clustering center as typical clustering images of a corresponding category, and calculate an average pixel value of each pixel position in the S typical clustering images, to obtain an average pixel image under the category;

assign each lighting tube to a lighting area according to the layout of lighting tubes in the corresponding car, and calculate an average value of pixel values for pixels in the lighting area corresponding to each lighting tube;

if the maximum pixel value in the average pixel image is greater than a pixel threshold, start lighting guidance and perform next step, otherwise skip lighting guidance;

extract pixels in the average pixel image whose average pixel values are greater than the pixel threshold, the pixels greater than the pixel threshold constituting a set of pixels to be guided; calculate a lighting guidance coefficient according to the coordinates of the lighting tubes in the spatial coordinate system, the coordinates of pixels in the set of pixels to be guided in the spatial coordinate system, and the average value of pixel values for the pixels in the lighting area, wherein the specific calculation expression is:

$$\beta_n = A_n \left( \sqrt{(x_0^n - x_1^l)^2 + (y_0^n - y_1^w)^2} + \sqrt{(x_0^n - x_2^l)^2 + (y_0^n - y_1^w)^2} + \ldots \right.$$
$$\left. \ldots + \sqrt{(x_0^n - x_H^l)^2 + (y_0^n - y_H^w)^2} \right)$$

where, $\beta_n$ is the lighting guidance coefficient, $A_n$ is the average value of pixel values for pixels in the lighting area corresponding to the $n^{th}$ lighting tube, $(x_0^n, y_0^n)$ is the coordinates of the $n^{th}$ lighting tube in the spatial coordinate system, $(x_1^l, y_1^w)$ is the coordinates of the first pixel in the set of pixels to be guided in the spatial coordinate system, $(x_2^l, y_2^w)$ is the coordinates of the second pixel in the set of pixels to be guided in the spatial coordinate system, $(x_H^l, y_H^w)$ is the coordinates of the $H^{th}$ pixel in the set of pixels to be guided in the spatial coordinate system, and H is the number of pixels in the set of pixels to be guided;

adjust the brightness of the lighting tubes in the lighting areas corresponding to the $\beta_n$ values according to the order of the $\beta_n$ values, and guide passengers to flow toward the lighting area with a smaller $\beta_n$ value.

Beneficial Effects

Compared with the prior art, the present invention provides training method and system for a passenger distribution prediction model, and the passenger guiding method and system. In the present invention, the passenger distribution is intelligently sensed by means of the characteristics that passenger density changes causes temperature, humidity and $CO_2$ concentration distribution to change in cars, which avoids the problems of crowd flow and obscuration faced by passenger distribution detection method conducted with images, and avoids the shortcoming in invasive reconstruction of floor faced by passenger distribution detection method conducted with pressure sensors; the passenger distribution data in each car is mapped to the spatial coordinate system, and the passenger distribution is described in pixels, which realizes intelligent classification of passenger distribution modes by image clustering, and solves the problems of inaccurate description of passenger distribution modes in cars and inaccurate description of typical distribution modes in cars; the passenger flow is guided by adjusting the brightness of the lighting tubes in the car, for example, the lighting tubes in areas with high passenger density are dimmed, and the lighting tubes in areas with low passenger density are brightened, to guide ordered flow of passengers toward areas with low passenger density (i.e. empty areas), which avoids the noisy environment of the car, and the lighting guidance method has the advantages of simplicity, directness and has high level of public acceptance.

BRIEF DESCRIPTION OF THE DRAWINGS

In order to more clearly illustrate the technical solutions of the present invention, the drawings used in the description of the embodiments will be briefly described below. Obviously, the drawings in the following description are only some embodiments of the present invention, and those of ordinary skill in the art can also obtain other drawings according to the drawings without any creative effort.

DETAILED DESCRIPTION OF THE EMBODIMENTS

A clear and complete description will be made to the technical solutions in the present invention below with reference to the accompanying drawings in the embodiments of the present invention. Apparently, the embodiments described are only part of the embodiments of the present invention, not all of them. All other embodiments obtained by those of ordinary skill in the art based on the embodiments of the present invention without any creative effort shall fall within the protection scope of the present invention.

Figure 1:
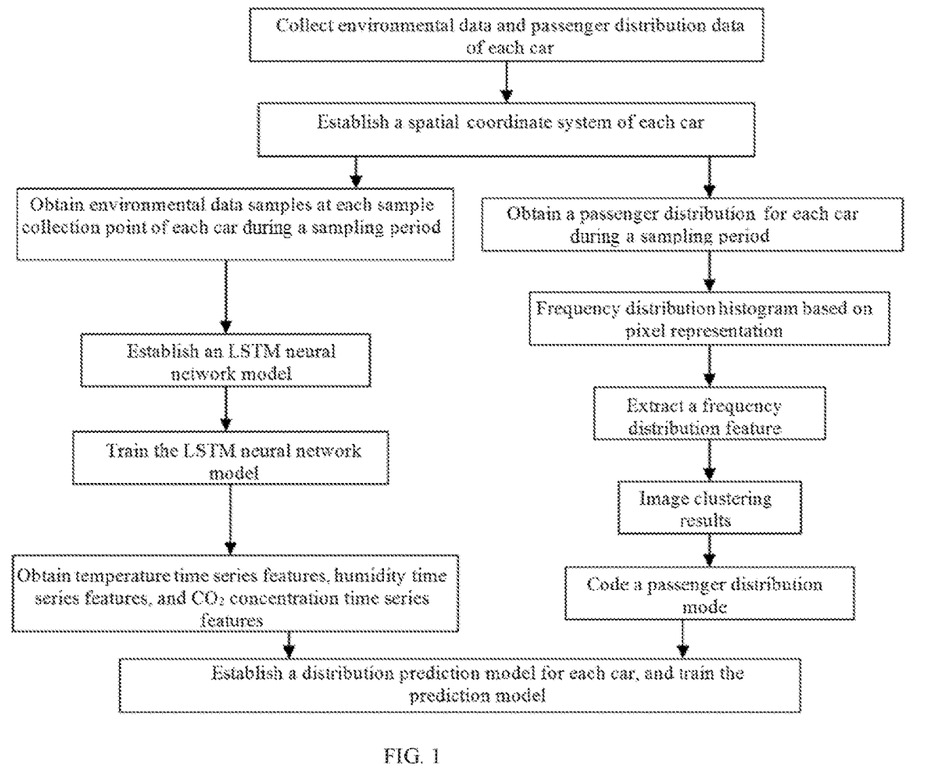
FIG. 1 is a flowchart of a training method for a distribution prediction model of passengers in a subway car in an embodiment of the present invention.

As shown in FIG. 1, a training method for a distribution prediction model of passengers in a subway car provided by this embodiment includes:

1. Obtaining of Training Samples 1.1 Establishment of a Coordinate System and Setting of Collection Devices A spatial coordinate system of each car is established, a collection device constituted by temperature and humidity sensors and a $CO_2$ concentration sensor is installed in each car, each collection device serves as a sample collection point, and installation coordinates of each sample collection point in the corresponding spatial coordinate system are obtained. The spatial coordinate system is a two-dimensional rectangular coordinate system parallel to the roof or the ground, or the spatial coordinate system is a two-dimensional rectangular coordinate system coincident with the roof or the ground. The spatial coordinate system facilitates the mapping of sample collection points and passengers (or independent units constituted by passengers) into the spatial coordinate system.

In this embodiment, the spatial coordinate system is a two-dimensional rectangular coordinate system with the horizontal centerline of the roof as the x-axis and the longitudinal centerline of the roof as the y-axis, or the spatial coordinate system is a two-dimensional rectangular coordinate system with the horizontal centerline of the ground as the x-axis and the longitudinal centerline of the ground as the y-axis.

In order to obtain the mapping relationship between the distribution of passengers in the subway car and environmental parameters, original environmental data is collected first by the collection device. 15 collection devices are installed on the roof of each car, and the 15 collection devices are arranged in a 3×5 array. It is assumed that the installation coordinates of the $i^{th}$ sample collection point in the corresponding spatial coordinate system are $P_i=(x_i, y_i)$, $i=1, 2, \ldots, o$, and o is 15 in this embodiment.

1.2 Obtaining of Training Input Samples (i.e. Original Environmental Data Samples)

A temperature time series, a humidity time series, and a $CO_2$ concentration time series at each sample collection point of each car during a sampling period are obtained, an average temperature value and an average humidity value locally of the day are obtained; and the installation coordinates of each sample collection point, the temperature time series, the humidity time series, and the $CO_2$ concentration time series corresponding to the sample collection point, and the average temperature value and the average humidity value constitute an environmental data sample at each sample collection point of each car during the sampling period.

The time when screen doors of the subway is opened after the arrival of the subway is defined as a time start 0 of the sampling period, the time when positions of passengers are basically stable after completion of passenger boarding (i.e. no crowd flow) is defined as an end T of the sampling period, and the collection device obtains a temperature time series $$Temp^i = \left\{temp_t^i, t = 1, 2, \ldots, \frac{T}{t_0}\right\},$$

a humidity time series $$RH^i = \left\{Rh_t^i, t = 1, 2, \ldots, \frac{T}{t_0}\right\}$$

and a $CO_2$ concentration time series $$C_{co2}^i\left\{c_t^i, t=1, 2, \ldots, \frac{T}{t_0}\right\}$$

of the $i^{th}$ sample collection point during a sampling period, where $t_0$ is a sampling interval, T is a duration of the sampling period, $temp_t^i$ is a temperature value of the $i^{th}$ sample collection point at time t, $Rh_t^i$ is a humidity value of the $i^{th}$ sample collection point at time t, and $c_t^i$ is a $CO_2$ concentration value of the $i^{th}$ sample collection point at time t. An average temperature value $temp_0$ and an average humidity value $Rh_0$ locally of the day are obtained, then the environmental data sample obtained during a sampling period (time 0 to time T) is $$E=[x_i,y_i,temp_t^i,Rh_t^i,c_t^i,temp_0,Rh_0].$$

1.3 Obtaining of Training Output Samples (i.e. Coding of Passenger Distribution)

1.31 Obtaining of Passenger Distribution

In order to avoid the problem of low accuracy of passenger distribution detection due to obscuration and the like in other existing passenger distribution collection modes, passenger positions in each car at an end time T of the sampling period are recorded by artificial statistics, and coordinates of passengers in the corresponding spatial coordinate system are obtained, i.e. a passenger distribution for each car during the sampling period is obtained, specifically denoted as $D=\{x_j,y_j,j=1, 2, \ldots, N\}$, where j is the $j^{th}$ passenger, N is the number of passengers in the car, and $(x_j,y_j)$ is the coordinates of the $j^{th}$ passenger in the corresponding spatial coordinate system.

1.32 Coding of a Passenger Distribution Mode of Each Car

In order to quantitatively describe the passenger distribution, the passenger distribution mode is coded.

The specific coding steps are as follows:
a. The passenger distribution for each car during the sampling period (time 0 to time T) is converted into a binary image, specifically:
 a1. Each car is divided into W equal parts along the x-axis of the spatial coordinate system of the car, and each car is divided into L equal parts along the y-axis of the spatial coordinate system of the car, to convert the space of each car into W×L independent units. In this embodiment, L=3 and W=10.
 a2. Each independent unit is set as a pixel, and the number of passengers in each independent unit is a pixel value of the pixel, that is, the number of passengers I (l, w) in the independent unit of row l and column w is the pixel value of the pixel in row l and column w, I=1,2, 3, . . . , L, w=1,2,3, . . . , W.
 a3. The pixel values of all pixels are obtained, and the passenger distribution is converted into a binary image constituted by W×L pixels.
b. A mean value, a variance, a maximum value $I_{max}$ and a minimum value $I_{min}$ of pixels in the binary image are calculated.

The mean value $\bar{I}$ of pixels in the binary image is $$\bar{I} = \frac{1}{L \times W} \sum_{l=1,w=1}^{l=L,w=W} I(l, w) \quad (1)$$

The variance $I_{SDE}$ of pixels in the binary image is $$I_{SDE} = \sqrt{\sum_{l=1,w=1}^{l=L,w=W} (I(l, w) - \bar{I})^2/(L \times W)} \quad (2)$$

c. In order to obtain a feature of change in the pixel values of the binary image in different directions, an amplitude and a gradient direction of each pixel in the binary image are calculated, and a frequency distribution histogram is established with the gradient direction of all pixels as the abscissa axis and the pixel value corresponding to each pixel as the ordinate axis; and a frequency distribution feature of the frequency distribution histogram is extracted, the frequency distribution feature referring to a feature vector constituted by pixel values corresponding to each interval among R intervals equally divided from the abscissa axis of the frequency distribution histogram.

Formulas for calculating the amplitude and the gradient direction of each pixel in the binary image are respectively:

$$G(l, w) = \sqrt{G_x(l, w)^2 + G_y(l, w)^2} \quad (3)$$

$$\theta(l, w) = \arctan\frac{G_y(l, w)}{G_x(l, w)} \quad (4)$$

$$G_x(l, w) = I(l+1, w) - I(l-1, w) \quad (5)$$

$$G_y(l, w) = I(l, w+1) - I(l, w-1) \quad (6)$$

Where, G(l, w) is the amplitude of the pixel, $\theta$(l, w) is the gradient direction of the pixel, $G_x$(l, w) is the gradient amplitude of the pixel along the x-axis of the spatial coordinate system, $G_y$(l, w) is the gradient amplitude of the pixel along the y-axis of the spatial coordinate system, I(l+1, w) is the pixel value of the pixel in row l+1 and column w, and I(l-1, w) is the pixel value of the pixel in row l-1 and column w.

In this embodiment, R=9, that is, the gradient direction is divided into 9 equal parts within [0,180°], to construct 9 gradient direction intervals [0, 20°), [20, 40°), [40,60°), [60,80°), [80,100°), [100,120°), [120,140°), [140,160°), and [160,180°]. At the time start of each sampling period, the initial frequency value of each interval is 0, that is, the cumulative pixel value of the gradient direction in this interval is 0, then the initial gradient direction frequency vector is $F_0=\{0, 0, 0, 0, 0, 0, 0, 0, 0\}$, where $F_0$ indicates that the initial frequency values of the 9 intervals are all 0. The gradient direction frequency vector is set to be $F_{l\times w}=\{f_1, \ldots f_r, \ldots f_9\}$, and if the gradient direction of the $(l\times w)^{th}$ pixel falls within the $r^{th}$ interval, the updated gradient direction frequency vector is $F_{l\times w}=\{f_1, \ldots f_r+G(l,w), \ldots f_9\}$, where l×w=1, 2, . . . L×W, r=1, 2, . . . 9. The final gradient direction frequency vector $F_{L\times W}$ obtained after all pixels are traversed is the frequency distribution feature of the binary image.

d. The mean value, the maximum value, the minimum value, the variance and the frequency distribution feature of the pixels are combined to form an original feature vector $P=[\bar{I},I_{max}, I_{SDE}, F_{L\times W}]$, and the binary images are clustered with the original feature vector P as input of a clustering algorithm to obtain image clustering results.

The clustering algorithm for classification is the prior art. In this embodiment, the clustering algorithm is an OPTICS algorithm for clustering the binary images to obtain image clustering results. The initial neighborhood distance parameter ε of the OPTICS algorithm is set to 0.2, and the initial neighborhood sample parameter MinPts is set to 3. The OPTICS algorithm is the prior art, and the OPTICS algorithm is not sensitive to input parameters, which improves the accuracy of clustering results.

e. The passenger distribution mode is coded according to the image clustering results to obtain a passenger distribution code. Each category of image clustering result corresponds to a passenger distribution mode, and each passenger distribution mode corresponds to a passenger distribution code. The clustering results show that the same category of images are the same category of image samples, the passenger distribution mode corresponding to the same category of image samples is the same type of distribution mode, and each type of passenger distribution mode corresponds to a passenger distribution code. For example, the image clustering results show that the images are divided into 5 categories, then 5 passenger distribution codes $[1, 0, 0, 0, 0]^T$, $[0, 1, 0, 0, 0]^T$, $[0, 0, 1, 0, 0]^T$, $[0, 0, 0, 1, 0]^T$ and $[0, 0, 0, 0, 1]^T$ can be obtained according to binary codes. The passenger distribution codes are sorted in descending order according to the number of image samples in the category it belongs to, the first passenger distribution code is $[1, 0, 0, 0, 0]^T$, the second passenger distribution code is $[0, 1, 0, 0, 0]^T$, the third passenger distribution code is $[0, 0, 1, 0, 0]^T$, the fourth passenger distribution code is $[0, 0, 0, 1, 0]^T$, and the fifth type of passenger distribution code is $[0, 0, 0, 0, 1]^T$.

1.4 Processing of the Original Environmental Data Samples

The temperature time series, the humidity time series, and the $CO_2$ concentration time series in the original environmental data samples have high dimensionality. In order to reduce the dimensionality of input training samples and reduce the complexity of subsequent model training and testing, a LSTM neural network model is established to extract feature vectors. The specific process is: A temperature time series LSTM neural network model is established, and the temperature time series LSTM neural network model is trained with a first training set to obtain a trained temperature time series LSTM neural network model; a classification layer of the trained temperature time series LSTM neural network model is removed, and a temperature time series feature vector is obtained with a second training set as input and a vector outputted by a fully connected layer as output; the temperature time series during a sampling period in step 1.21 is randomly divided into two temperature training sets, one of the temperature training sets and the passenger distribution code corresponding to the temperature training set (step e) constitute the first training set, and the other temperature training set is the second training set. For example, the temperature time series $$Temp^i = \left\{ temp_t^i, t = 1, 2, \ldots, \frac{T}{t_0} \right\}$$

during a sampling period is divided into two temperature training sets according to a proportion of 5:3, the time series has a length of $T/t_0$, and the feature dimension is the number o of the sample collection points. The humidity time series and the $CO_2$ concentration time series are processed in similar ways as that of the temperature time series.

A humidity time series LSTM neural network model is established, and the humidity time series LSTM neural network model is trained with a third training set to obtain a trained humidity time series LSTM neural network model; a classification layer of the trained humidity time series LSTM neural network model is removed, and a humidity time series feature vector is obtained with a fourth training set as input and a vector outputted by a fully connected layer as output; the humidity time series during a sampling period in step 1.21 is randomly divided into two humidity training sets, one of the humidity training sets and the passenger distribution code corresponding to the humidity training set constitute the third training set, and the other humidity training set is the fourth training set.

A $CO_2$ concentration time series LSTM neural network model is established, and the $CO_2$ concentration time series LSTM neural network model is trained with a fifth training set to obtain a trained $CO_2$ concentration time series LSTM neural network model; a classification layer of the trained $CO_2$ concentration time series LSTM neural network model is removed, and a $CO_2$ concentration time series feature vector is obtained with a sixth training set as input and a vector outputted by a fully connected layer as output; the $CO_2$ concentration time series during a sampling period in step 1.21 is randomly divided into two $CO_2$ concentration training sets, one of the $CO_2$ concentration training sets and the passenger distribution code corresponding to the $CO_2$ concentration training set constitute the fifth training set, and the other $CO_2$ concentration training set is the sixth training set.

The temperature time series, the humidity time series, and the $CO_2$ concentration time series in the training input samples are replaced with the temperature time series feature vector, the humidity time series feature vector, and the $CO_2$ concentration time series feature vector respectively, to obtain new environmental data samples E' in the training input samples.

The establishment of the LSTM neural network model is the prior art. In this embodiment, the number of neurons in a hidden layer of the LSTM neural network model is 100, and the number of training iterations is 2000.

2. Establishment of a distribution prediction model for each car, and training of the distribution prediction model (i.e. obtaining of a mapping relationship between environmental data and passenger distribution)

A distribution prediction model for each car is established, and the distribution prediction model is trained with training samples to obtain a trained distribution prediction model, the training sample taking the new environmental data sample E' at each sample collection point of the car during a sampling period in step 1 as input and the corresponding passenger distribution code as output.

The distribution prediction model may be any of a support vector machine model, a relevance vector machine model or a neural network model, and the establishment of the distribution prediction model is the prior art.

A training system for a distribution prediction model of passengers in a subway car provided by this embodiment includes a plurality of training subsystems, each car corresponds to a training subsystem, and each training subsystem includes a plurality of collection devices arranged on the roof of the car and a control device; and the collection device includes temperature and humidity sensors and a $CO_2$ concentration sensor. The setting of the collection device is recorded in step 1.1.

The control device may be shared by the entire train, or each car corresponds to a control device.

Corresponding to the training method for a distribution prediction model of passengers in a subway car, the control device includes:
   a coordinate system establishment unit, configured to establish a spatial coordinate system of each car, and obtain installation coordinates of each sample collection point in the corresponding spatial coordinate system, each collection device serving as a sample collection point;
   an environmental data obtaining unit, configured to obtain a temperature time series, a humidity time series, and a $CO_2$ concentration time series of each sample collection point of each car during a sampling period, and obtain an average temperature value and an average humidity value locally of the day, wherein the installation coordinates of each sample collection point, the temperature time series, the humidity time series, and the $CO_2$ concentration time series corresponding to the sample collection point, and the average temperature value and average humidity value constitute an environmental data sample of each sample collection point of each car during the sampling period; a passenger distribution obtaining unit, configured to obtain coordinates of passengers in the corresponding spatial coordinate system according to the recorded passenger positions in each car at an end time of the sampling period, i.e. obtain a passenger distribution for each car during the sampling period;
   an image conversion and feature extraction unit, configured to convert the passenger distribution for each car during the sampling period into a binary image, and calculate a mean value, a variance, a maximum value and a minimum value of pixels in the binary image according to formulas (1) and (2); calculate an amplitude and a gradient direction of each pixel in the binary image according to formulas (3) to (6), and establish a frequency distribution histogram with the gradient direction of all pixels as the abscissa axis and the pixel value corresponding to each pixel as the ordinate axis; and extract a frequency distribution feature of the frequency distribution histogram, the frequency distribution feature referring to a feature vector constituted by pixel values corresponding to each interval among R intervals equally divided from the abscissa axis of the frequency distribution histogram;
   a clustering classification unit, configured to combine the mean value, the maximum value, the minimum value, the variance and the frequency distribution feature of the pixels to form an original feature vector, and cluster the binary images with the original feature vector as input of a clustering algorithm to obtain image clustering results;
   a coding unit, configured to code the passenger distribution mode according to the image clustering results to obtain a passenger distribution code, each type of image clustering result corresponding to a passenger distribution mode, and each passenger distribution mode corresponding to a passenger distribution code; and
   a model training unit, configured to establish a distribution prediction model for each car, and train the distribution prediction model with training samples to obtain a trained distribution prediction model, the training sample taking the environmental data sample at each sample collection point of each car during the sampling period as input and the corresponding passenger distribution code as output.

Figure 2:
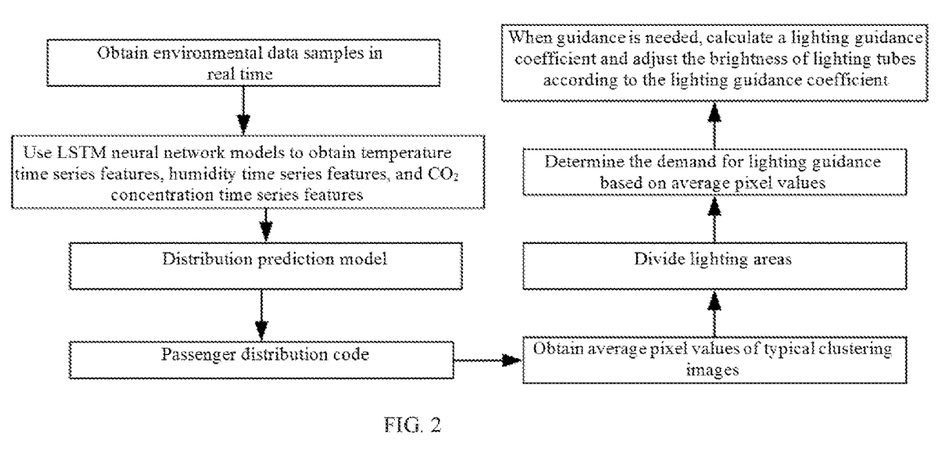
FIG. 2 is a flowchart of a passenger guiding method for a subway car based on environmental monitoring and lighting guidance in an embodiment of the present invention.

As shown in FIG. 2, a method for guiding passengers in a subway car based on environmental monitoring and lighting guidance provided by this embodiment includes:
3.1 Obtaining of Prediction Samples
   3.11 During the prediction, the collection device set in step 1.1 obtain an environmental data sample of each sample collection point of each car during each sampling period in real time. The environmental data sample is constituted by installation coordinates of each sample collection point, a temperature time series, a humidity time series, and a $CO_2$ concentration time series corresponding to the sample collection point, and an average temperature value and an average humidity value.
   3.12 The temperature time series in the environmental data samples of step 3.11 is inputted into the trained temperature time series LSTM neural network model with the classification layer removed in step 1.4, the vector outputted by the fully connected layer being a corresponding temperature time series feature vector; The humidity time series in the environmental data samples of step 3.11 is inputted into the trained humidity time series LSTM neural network model with the classification layer removed in step 1.4, the vector outputted by the fully connected layer being a corresponding humidity time series feature vector;
   The $CO_2$ concentration time series in the environmental data samples of step 3.11 is inputted into the trained $CO_2$ concentration time series LSTM neural network model with the classification layer removed in step 1.4, the vector outputted by the fully connected layer being a corresponding $CO_2$ concentration time series feature vector.
   3.13 The temperature time series, the humidity time series, and the $CO_2$ concentration time series in the environmental data samples obtained in real time are replaced with the temperature time series feature vector, the humidity time series feature vector, and the $CO_2$ concentration time series feature vector respectively, to obtain new environmental data samples obtained in real time.

3.2 Obtaining of Prediction Results
   The new environmental data samples obtained in real time are inputted into the distribution prediction model for the corresponding car which is trained by the training method for the distribution prediction model of passengers in the subway car, to obtain a predicted passenger distribution code for each car during the corresponding sampling period.

3.3 Lighting Guidance
   Taking the end time of the sampling period as a time start, the brightness of lighting tubes in the corresponding car is adjusted according to the predicted passenger distribution code for the car during the corresponding sampling period to guide passenger flow. The specific process is:
   3.31 A current image clustering result (i.e. a category of current passenger distribution) is obtained according to the predicted passenger distribution code for the car during the corresponding sampling period, and a clustering center corresponding to the current image is determined according to the current image clustering result. The image clustering result includes the clustering center and samples around the clustering center.

3.32 S binary images closest to the clustering center are defined as typical clustering images of a corresponding category, and an average pixel value of each pixel position in the S typical clustering images is calculated, to obtain an average pixel image under the category.

In this embodiment, S=10, and an average pixel value of the pixel position (l, w) in the 10 typical clustering images is $$\bar{I}(l, w) = \frac{1}{10}\sum_{k=1}^{10} I(l, w)_k,$$

where $I(l,w)_k$ is the pixel value of the $k^{th}$ typical clustering image at the position (l, w). An average pixel value of each pixel position in the 10 typical clustering images is calculated, that is, an average pixel value of the pixels at the same position (or corresponding position) in the 10 typical clustering images is solved, and the number of average pixel values corresponds to the number of pixels on the typical clustering image.

Figure 3:
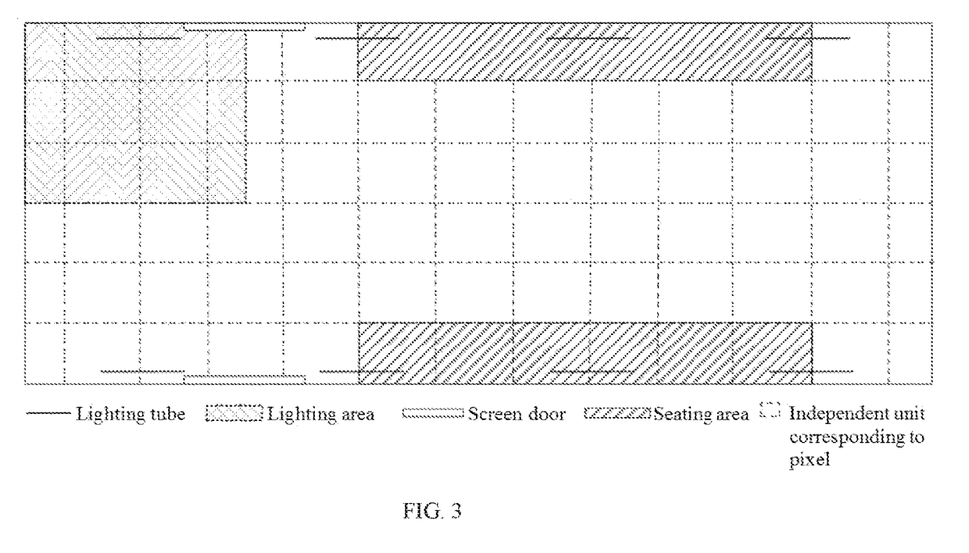
FIG. 3 is a schematic diagram of the layout of lighting tubes and lighting areas in an embodiment of the present invention.

3.33 According to the layout of lighting tubes of each car, each lighting tube is assigned to a lighting area in accordance with the principle of proximity. As shown in FIG. 3, dual-line parallel layout and lighting with 8 strip LED lamp panels are the typical lighting mode of the subway train. The brightness of 8 strip LED tubes is controlled to change the brightness distribution of the passenger compartment, so as to guide passenger flow.

An average value of pixel values for pixels in the lighting area corresponding to each lighting tube is calculated. The line connecting the points, located about the same distance from the centers of the lighting tubes respectively in two adjacent lighting areas, constitutes a dividing line of the two adjacent lighting areas.

3.34 If the maximum pixel value $\bar{I}_{max}$ in the average pixel image is greater than a pixel threshold $\delta$, lighting guidance is started and next step 3.35 is performed (i.e. as long as the average value for a pixel position is greater than the pixel threshold $\delta$, the lighting guidance is started), otherwise, no lighting guidance is required. In this embodiment, $\delta=15$, and the average value for the pixel position which is greater than 8 indicates a crowded state.

3.35 Pixels in the average pixel image whose average pixel values are greater than the pixel threshold $\delta$ are extracted, and the pixels whose average pixel values are greater than the pixel threshold constitute a set of pixels to be guided $\bar{I}_A\{\bar{I}(l_1,w_1), \bar{I}(l_2,w_2), \ldots, \bar{I}(l_H,w_H)\}$, where $\bar{I}(l_1,w_1)$ is an average pixel value of the first pixel in the pixels to be guided, $\bar{I}(l_2,w_2)$ is an average pixel value of the second pixel in the pixels to be guided, $\bar{I}(l_H,w_H)$ is an average pixel value of the $H^{th}$ pixel in the pixels to be guided, H is the number of pixels in the set of pixels to be guided, $(l_1, w_1)$ indicates that the first pixel in the pixels to be guided is a pixel corresponding to the independent unit with the row of $l_1$ and the column of $w_1$, i.e. pixel coordinates of the pixel, and other pixels can be analogized using the above method.

3.36 A lighting guidance coefficient is calculated according to the coordinates of the lighting tubes in the spatial coordinate system, the coordinates of pixels in the set of pixels to be guided in the spatial coordinate system, and the average value of pixel values for the pixels in the lighting area. The specific calculation expression is:

$$\beta_n = A_n \left( \sqrt{(x_0^n - x_1^l)^2 + (y_0^n - y_1^w)^2} + \sqrt{(x_0^n - x_2^l)^2 + (y_0^n - y_1^w)^2} + \ldots \right. \tag{7}$$
$$\left. \ldots + \sqrt{(x_0^n - x_H^l)^2 + (y_0^n - y_H^w)^2} \right)$$

Where, $\beta_n$ is the lighting guidance coefficient, $A_n$ is the average value of pixel values for pixels in the lighting area corresponding to the $n^{th}$ lighting tube, $(x_0^n, y_0^n)$ is the coordinates of the $n^{th}$ lighting tube in the spatial coordinate system, $(x_1^j, y_1^w)$ is the coordinates of the first pixel in the set of pixels to be guided in the spatial coordinate system, $(x_2^l, y_2^w)$ is the coordinates of the second pixel in the set of pixels to be guided in the spatial coordinate system, and $(x_H^j, y_H^w)$ is the coordinates of the $H^{th}$ pixel in the set of pixels to be guided in the spatial coordinate system.

3.37 The brightness of the lighting tubes in the lighting areas corresponding to the $\beta_n$ values are adjusted according to the order of the $\beta_n$ values, and the passengers are guided to flow toward the lighting area with a smaller $\beta_n$ value.

For example, the $\beta_n$ values are sorted from large to small, the lighting tubes in the lighting area corresponding to the maximum $\beta_n$ value are adjusted to the darkest, the lighting tubes in the lighting area corresponding to the minimum $\beta_n$ value are adjusted to the brightest, and the lighting tubes in the lighting area with smaller $\beta_n$ value are adjusted to be brighter than the lighting tubes in the lighting area with larger $\beta_n$ value. The passenger flow is guided by changing the brightness distribution in the car. This guidance method has the advantages of simplicity, directness, and has high level of public acceptance.

This embodiment further provides a system for guiding passengers in a subway car based on environmental monitoring and lighting guidance, including:

a real-time data obtaining unit, configured to obtain an environmental data sample at each sample collection point of each car during each sampling period in real time; the environmental data sample being constituted by installation coordinates of each sample collection point, a temperature time series, a humidity time series, and a $CO_2$ concentration time series corresponding to the sample collection point, and an average temperature value and an average humidity value;

a prediction unit, configured to input the environmental data samples into the distribution prediction model for the corresponding car which is trained by the training method for the distribution prediction model of passengers in the subway car, to obtain a predicted passenger distribution code for each car during the corresponding sampling period; and an adjustment and guidance unit, configured to adjust the brightness of lighting tubes in the corresponding car according to the predicted passenger distribution code for the car during the corresponding sampling period to guide passenger flow.

Disclosed above are only the specific embodiments of the present invention, but the protection scope of the present invention is not limited thereto. Any person skilled in the art can easily conceive of changes or modifications within the technical scope disclosed in the present invention, and these changes and modifications shall fall within the protection scope of the present invention.

The invention claimed is:

1. A training method for a distribution prediction model of passengers in a subway car, comprising:

establishing a spatial coordinate system of the subway car, installing a collection device constituted by temperature and humidity sensors and a $CO_2$ concentration sensor in the subway car, each collection device serving as a sample collection point, and obtaining installation coordinates of each sample collection point in the corresponding spatial coordinate system;

obtaining a temperature time series, a humidity time series, and a $CO_2$ concentration time series at each sample collection point of the subway car during a sampling period, and obtaining an average temperature value and an average humidity value locally of a day, wherein the installation coordinates of each sample collection point, the temperature time series, the humidity time series, and the $CO_2$ concentration time series corresponding to the sample collection point, and the average temperature value and the average humidity value constitute an environmental data sample at each sample collection point of the subway car during the sampling period;

recording passenger positions in the subway car at an end time of the sampling period, and obtaining coordinates of passengers in the corresponding spatial coordinate system, so as to obtain a passenger distribution for the subway car during the sampling period;

converting the passenger distribution for the subway car during the sampling period into a binary image, and calculating a mean value, a variance, a maximum value and a minimum value of pixels in the binary image;

calculating an amplitude and a gradient direction of each pixel in the binary image, and establishing a frequency distribution histogram with a gradient direction of all pixels as an abscissa axis and a pixel value corresponding to each pixel as an ordinate axis; extracting a frequency distribution feature of the frequency distribution histogram, the frequency distribution feature referring to a feature vector constituted by pixel values corresponding to each interval among R intervals equally divided from the abscissa axis of the frequency distribution histogram;

combining the mean value, the maximum value, the minimum value, the variance and the frequency distribution feature of the pixels in the binary image to form an original feature vector associated with the binary image, and clustering the binary images for multiple sampling periods with the associated original feature vectors as-input of a clustering algorithm to obtain image clustering results; coding a passenger distribution mode according to the image clustering results to obtain a passenger distribution code, each category of image clustering result corresponding to one passenger distribution mode, and each passenger distribution mode corresponding to one passenger distribution code; and establishing a distribution prediction model of passengers in the subway car, and training the distribution prediction model with training samples to obtain a trained distribution prediction model, the training sample taking the environmental data sample at-each sample collection point of the subway car during the sampling period as input and the corresponding passenger distribution code as output.

2. The training method for the distribution prediction model of passengers in the subway car according to claim 1, wherein the spatial coordinate system is a first two-dimensional rectangular coordinate system with a horizontal centerline of a roof of the subway car as an x-axis and a longitudinal centerline of the roof as a y-axis, or the spatial coordinate system is a second two-dimensional rectangular coordinate system with a horizontal centerline of a ground of the subway car as the x-axis and a longitudinal centerline of the ground as they-axis.

3. The training method for the distribution prediction model of passengers in the subway car according to claim 2, wherein the temperature time series, the humidity time series, and the $CO_2$ concentration time series in the training samples are replaced with a temperature time series feature vector, a humidity time series feature vector, and a $CO_2$ concentration time series feature vector, respectively, wherein the temperature time series feature vector, the humidity time series feature vector, and the $CO_2$ concentration time series feature vector are obtained as follows:

establishing a temperature time series LSTM neural network model, and randomly dividing the temperature time series in the training samples into two temperature training sets, wherein one of the temperature training sets and the passenger distribution code constitute a first training set, and the other temperature training set is a second training set; training the temperature time series LSTM neural network model with the first training set to obtain a trained temperature time series LSTM neural network model;

removing a classification layer of the trained temperature time series LSTM neural network model, and obtaining the temperature time series feature vector with the second training set as input and a vector outputted by a fully connected layer as output;

establishing a humidity time series LSTM neural network model, and randomly dividing the humidity time series in the training samples into two humidity training sets, wherein one of the humidity training sets and the passenger distribution code constitute a third training set, and the other humidity training set is a fourth training set;

training the humidity time series LSTM neural network model with the third training set to obtain a trained humidity time series LSTM neural network model; removing a classification layer of the trained humidity time series LSTM neural network model, and obtaining the humidity time series feature vector with the fourth training set as input and a vector outputted by a fully connected layer as output; and establishing a $CO_2$ concentration time series LSTM neural network model, and randomly dividing the $CO_2$ concentration time series in the training samples into two $CO_2$ concentration training sets, wherein one of the $CO_2$ concentration training sets and the passenger distribution code constitute a fifth training set, and the other $CO_2$ concentration training set is a sixth training set; training the $CO_2$ concentration time series LSTM neural network model with the fifth training set to obtain a trained $CO_2$ concentration time series LSTM neural network model; removing a classification layer of the trained $CO_2$ concentration time series LSTM neural network model, and obtaining the $CO_2$ concentration time series feature vector with the sixth training set as input and a vector outputted by a fully connected layer as output.

4. A system for guiding passengers in a subway car based on environmental monitoring and lighting guidance, comprising:

a real-time data obtaining unit, configured to obtain the environmental data sample at each sample collection point of the subway car during each sampling period in real time, the environmental data sample being constituted by installation coordinates of each sample collection point, the temperature time series, the humidity time series, and the $CO_2$ concentration time series corresponding to the sample collection point, and the average temperature value and the average humidity value;

a prediction unit, configured to input the environmental data sample into the distribution prediction model for a corresponding car which is trained by the training method according to claim 2, to obtain a predicted passenger distribution code for the subway car during the corresponding sampling period in real time; and an adjustment and guidance unit, configured to adjust a brightness of lighting tubes in a corresponding car according to the predicted passenger distribution code for the subway car during the corresponding sampling period to guide passenger flow.

5. The training method for the distribution prediction model of passengers in the subway car according to claim 1, wherein 15 collection devices are installed on a roof of the subway car, and the 15 collection devices are arranged in an array.

6. The training method for the distribution prediction model of passengers in the subway car according to claim 5, wherein the temperature time series, the humidity time series, and the $CO_2$ concentration time series in the training samples are replaced with a temperature time series feature vector, a humidity time series feature vector, and a $CO_2$ concentration time series feature vector, respectively, wherein the temperature time series feature vector, the humidity time series feature vector, and the $CO_2$ concentration time series feature vector are obtained as follows:

establishing a temperature time series LSTM neural network model, and randomly dividing the temperature time series in the training samples into two temperature training sets, wherein one of the temperature training sets and the passenger distribution code corresponding to the temperature training set constitute a first training set, and the other temperature training set is a second training set; training the temperature time series LSTM neural network model with the first training set to obtain a trained temperature time series LSTM neural network model;

removing a classification layer of the trained temperature time series LSTM neural network model, and obtaining the temperature time series feature vector with the second training set as input and a vector outputted by a fully connected layer as output;

establishing a humidity time series LSTM neural network model, and randomly dividing the humidity time series in the training samples into two humidity training sets, wherein one of the humidity training sets and the passenger distribution code corresponding to the humidity training set constitute a third training set, and the other humidity training set is a fourth training set; training the humidity time series LSTM neural network model with the third training set to obtain a trained humidity time series LSTM neural network model;

removing a classification layer of the trained humidity time series LSTM neural network model, and obtaining the humidity time series feature vector with the fourth training set as input and a vector outputted by a fully connected layer as output; and establishing a $CO_2$ concentration time series LSTM neural network model, and randomly dividing the $CO_2$ concentration time series in the training samples into two $CO_2$ concentration training sets, wherein one of the $CO_2$ concentration training sets and the passenger distribution code corresponding to the $CO_2$ concentration training set constitute a fifth training set, and the other $CO_2$ concentration training set is a sixth training set; training the $CO_2$ concentration time series LSTM neural network model with the fifth training set to obtain a trained $CO_2$ concentration time series LSTM neural network model; removing a classification layer of the trained $CO_2$ concentration time series LSTM neural network model, and obtaining the $CO_2$ concentration time series feature vector with the sixth training set as input and a vector outputted by a fully connected layer as output.

7. A system for guiding passengers in a subway car based on environmental monitoring and lighting guidance, comprising:

a real-time data obtaining unit, configured to obtain the environmental data sample at each sample collection point of the subway car during each sampling period in real time, the environmental data sample being constituted by installation coordinates of each sample collection point, the temperature time series, the humidity time series, and the $CO_2$ concentration time series corresponding to the sample collection point, and the average temperature value and the average humidity value;

a prediction unit, configured to input the environmental data sample into the distribution prediction model for a corresponding car which is trained by the training method according to claim 5, to obtain a predicted passenger distribution code for the subway car during the corresponding sampling period in real time; and an adjustment and guidance unit, configured to adjust a brightness of lighting tubes in the corresponding car according to the predicted passenger distribution code for the car during the corresponding sampling period to guide passenger flow.

8. The training method for the distribution prediction model of passengers in the subway car according to claim 1, wherein the specific process of converting the passenger distribution for the subway car during the sampling period into the binary image is as follows:

dividing the subway car into W equal parts along an x-axis of the spatial coordinate system of the subway car, and dividing the subway car into L equal parts along a y-axis of the spatial coordinate system of the subway car, to convert the space of the subway car into W×L independent units;

setting each independent unit as a pixel, a number of passengers in each independent unit being a pixel value of the pixel; and obtaining pixel values of all pixels, and converting the passenger distribution into the binary image composed of W×L pixels.

9. The training method for the distribution prediction model of passengers in the subway car according to claim 8, wherein the temperature time series, the humidity time series, and the $CO_2$ concentration time series in the training samples are replaced with a temperature time series feature vector, a humidity time series feature vector, and a $CO_2$ concentration time series feature vector, respectively, wherein the temperature time series feature vector, the humidity time series feature vector, and the $CO_2$ concentration time series feature vector are obtained as follows:

establishing a temperature time series LSTM neural network model, and randomly dividing the temperature time series in the training samples into two temperature training sets, wherein one of the temperature training sets and the passenger distribution code constitute a first training set, and the other temperature training set is a second training set; training the temperature time series LSTM neural network model with the first training set to obtain a trained temperature time series LSTM neural network model;

removing a classification layer of the trained temperature time series LSTM neural network model, and obtaining the temperature time series feature vector with the second training set as input and a vector outputted by a fully connected layer as output;

establishing a humidity time series LSTM neural network model, and randomly dividing the humidity time series in the training samples into two humidity training sets, wherein one of the humidity training sets and the passenger distribution code constitute a third training set, and the other humidity training set is a fourth training set;

training the humidity time series LSTM neural network model with the third training set to obtain a trained humidity time series LSTM neural network model; removing a classification layer of the trained humidity time series LSTM neural network model, and obtaining the humidity time series feature vector with the fourth training set as input and a vector outputted by a fully connected layer as output; and establishing a $CO_2$ concentration time series LSTM neural network model, and randomly dividing the $CO_2$ concentration time series in the training samples into two $CO_2$ concentration training sets, wherein one of the $CO_2$ concentration training sets and the passenger distribution code constitute a fifth training set, and the other $CO_2$ concentration training set is a sixth training set; training the $CO_2$ concentration time series LSTM neural network model with the fifth training set to obtain a trained $CO_2$ concentration time series LSTM neural network model; removing a classification layer of the trained $CO_2$ concentration time series LSTM neural network model, and obtaining the $CO_2$ concentration time series feature vector with the sixth training set as input and a vector outputted by a fully connected layer as output.

10. The training method for the distribution prediction model of passengers in the subway car according to claim 1, wherein formulas for calculating the amplitude and the gradient direction of the pixel are respectively:

$$G(l, w) = \sqrt{G_x(l, w)^2 + G_y(l, w)^2},$$

$$\theta(l, w) = \arctan\frac{G_y(l, w)}{G_x(l, w)}$$

$$G_x(l, w) = I(l+1, w) - I(l-1, w),$$

$$G_y(l, w) = I(l, w+1) - I(l, w-1)$$

where, $G(l,w)$ is the amplitude of the pixel, $\theta(l,w)$ is the gradient direction of the pixel, $Gx(l,w)$ is a gradient amplitude of the pixel along an x-axis of the spatial coordinate system, $Gy(l,w)$ is a gradient amplitude of the pixel along a y-axis of the spatial coordinate system, $I(l+1, w)$ is a pixel value of the pixel in row l+1 and column w, $I(l-1, w)$ is a pixel value of the pixel in row l-1 and column w, l=1, 2, 3 ... L, w=1, 2, 3 ... W, W is a number of equal parts divided from the subway car along the x-axis of the spatial coordinate system of the subway car, and L is a number of equal parts divided from the subway car along the y-axis of the spatial coordinate system of the subway car.

11. The training method for the distribution prediction model of passengers in the subway car according to claim 10, wherein the temperature time series, the humidity time series, and the $CO_2$ concentration time series in the training samples are replaced with a temperature time series feature vector, a humidity time series feature vector, and a $CO_2$ concentration time series feature vector, respectively, wherein the temperature time series feature vector, the humidity time series feature vector, and the $CO_2$ concentration time series feature vector are obtained as follows:

establishing a temperature time series LSTM neural network model, and randomly dividing the temperature time series in the training samples into two temperature training sets, wherein one of the temperature training sets and the passenger distribution code constitute a first training set, and the other temperature training set is a second training set; training the temperature time series LSTM neural network model with the first training set to obtain a trained temperature time series LSTM neural network model; removing a classification layer of the trained temperature time series LSTM neural network model, and obtaining the temperature time series feature vector with the second training set as input and a vector outputted by a fully connected layer as output;

establishing a humidity time series LSTM neural network model, and randomly dividing the humidity time series in the training samples into two humidity training sets, wherein one of the humidity training sets and the passenger distribution code constitute a third training set, and the other humidity training set is a fourth training set; training the humidity time series LSTM neural network model with the third training set to obtain a trained humidity time series LSTM neural network model; removing a classification layer of the trained humidity time series LSTM neural network model, and obtaining the humidity time series feature vector with the fourth training set as input and a vector outputted by a fully connected layer as output; and establishing a $CO_2$ concentration time series LSTM neural network model, and randomly dividing the $CO_2$ concentration time series in the training samples into two $CO_2$ concentration training sets, wherein one of the $CO_2$ concentration training sets and the passenger distribution code constitute a fifth training set, and the other $CO_2$ concentration training set is a sixth training set; training the $CO_2$ concentration time series LSTM neural network model with the fifth training set to obtain a trained $CO_2$ concentration time series LSTM neural network model; removing a classification layer of the trained $CO_2$ concentration time series LSTM neural network model, and obtaining the $CO_2$ concentration time series feature vector with the sixth training set as input and a vector outputted by a fully connected layer as output.

12. The training method for the distribution prediction model of passengers in the subway car according to claim 1, wherein the clustering algorithm is an OPTICS algorithm, an initial neighborhood distance parameter F of the OPTICS algorithm is 0.2, and an initial neighborhood sample parameter MinPts is 3.

13. The training method for the distribution prediction model of passengers in the subway car according to claim 12, wherein the temperature time series, the humidity time series, and the $CO_2$ concentration time series in the training samples are replaced with a temperature time series feature vector, a humidity time series feature vector, and a $CO_2$ concentration time series feature vector, respectively, wherein the temperature time series feature vector, the humidity time series feature vector, and the $CO_2$ concentration time series feature vector are obtained as follows:
establishing a temperature time series LSTM neural network model, and randomly dividing the temperature time series in the training samples into two temperature training sets, wherein one of the temperature training sets and the passenger distribution code constitute a first training set, and the other temperature training set is a second training set; training the temperature time series LSTM neural network model with the first training set to obtain a trained temperature time series LSTM neural network model;
removing a classification layer of the trained temperature time series LSTM neural network model, and obtaining the temperature time series feature vector with the second training set as input and a vector outputted by a fully connected layer as output;
establishing a humidity time series LSTM neural network model, and randomly dividing the humidity time series in the training samples into two humidity training sets, wherein one of the humidity training sets and the passenger distribution code constitute a third training set, and the other humidity training set is a fourth training set; training the humidity time series LSTM neural network model with the third training set to obtain a trained humidity time series LSTM neural network model; removing a classification layer of the trained humidity time series LSTM neural network model, and obtaining the humidity time series feature vector with the fourth training set as input and a vector outputted by a fully connected layer as output; and
establishing a $CO_2$ concentration time series LSTM neural network model, and randomly dividing the $CO_2$ concentration time series in the training samples into two $CO_2$ concentration training sets, wherein one of the $CO_2$ concentration training sets and the passenger distribution code constitute a fifth training set, and the other $CO_2$ concentration training set is a sixth training set; training the $CO_2$ concentration time series LSTM neural network model with the fifth training set to obtain a trained $CO_2$ concentration time series LSTM neural network model; removing a classification layer of the trained $CO_2$ concentration time series LSTM neural network model, and obtaining the $CO_2$ concentration time series feature vector with the sixth training set as input and a vector outputted by a fully connected layer as output.

14. The training method for the distribution prediction model of passengers in the subway car according to claim 1, wherein the temperature time series, the humidity time series, and the $CO_2$ concentration time series in the training samples are replaced with a temperature time series feature vector, a humidity time series feature vector, and a $CO_2$ concentration time series feature vector, respectively, wherein the temperature time series feature vector, the humidity time series feature vector, and the $CO_2$ concentration time series feature vector are obtained as follows:
establishing a temperature time series LSTM (Long Short Term Memory) neural network model, and randomly dividing the temperature time series in the training samples into two temperature training sets, wherein one of the temperature training sets and the passenger distribution code constitute a first training set, and the other temperature training set is a second training set; training the temperature time series LSTM neural network model with the first training set to obtain a trained temperature time series LSTM neural network model; removing a classification layer of the trained temperature time series LSTM neural network model, and obtaining the temperature time series feature vector with the second training set as input and a vector outputted by a fully connected layer as output;
establishing a humidity time series LSTM neural network model, and randomly dividing the humidity time series in the training samples into two humidity training sets, wherein one of the humidity training sets and the passenger distribution code constitute a third training set, and the other humidity training set is a fourth training set; training the humidity time series LSTM neural network model with the third training set to obtain a trained humidity time series LSTM neural network model; removing a classification layer of the trained humidity time series LSTM neural network model, and obtaining the humidity time series feature vector with the fourth training set as input and a vector outputted by a fully connected layer as output; and
establishing a $CO_2$ concentration time series LSTM neural network model, and randomly dividing the $CO_2$ concentration time series in the training samples into two $CO_2$ concentration training sets, wherein one of the $CO_2$ concentration training sets and the passenger distribution code constitute a fifth training set, and the other $CO_2$ concentration training set is a sixth training set; training the $CO_2$ concentration time series LSTM neural network model with the fifth training set to obtain a trained $CO_2$ concentration time series LSTM neural network model; removing a classification layer of the trained $CO_2$ concentration time series LSTM neural network model, and obtaining the $CO_2$ concentration time series feature vector with the sixth training set as input and a vector outputted by a fully connected layer as output.

15. A method for guiding passengers in a subway car based on environmental monitoring and lighting guidance, comprising:
obtaining the environmental data sample at each sample collection point of the subway car during each sampling period in real time, the environmental data sample being constituted by installation coordinates of each sample collection point, the temperature time series, the humidity time series, and the $CO_2$ concentration time series corresponding to the sample collection point, and the average temperature value and the average humidity value;
inputting the environmental data samples into the distribution prediction model for the subway car which is trained by the training method according to claim 7, to obtain a predicted passenger distribution code for the subway car during the corresponding sampling period in real time; and
adjusting a brightness of lighting tubes in a corresponding car according to the predicted passenger distribution code for the subway car during the corresponding sampling period to guide passenger flow.

16. The method for guiding passengers in the subway car according to claim 15, wherein the temperature time series, the humidity time series, and the $CO_2$ concentration time series in the environmental data samples are replaced with a temperature time series feature vector, a humidity time series feature vector, and a $CO_2$ concentration time series feature vector, respectively, wherein the temperature time series feature vector, the humidity time series feature vector, and the $CO_2$ concentration time series feature vector are obtained as follows:

inputting the temperature time series into the trained temperature time series LSTM neural network model with the classification layer removed, the vector outputted by the fully connected layer being the corresponding temperature time series feature vector; inputting the humidity time series into the trained humidity time series LSTM neural network model with the classification layer removed, the vector outputted by the fully connected layer being the corresponding humidity time series feature vector; and inputting the $CO_2$ concentration time series into the trained $CO_2$ concentration time series LSTM neural network model with the classification layer removed, the vector outputted by the fully connected layer being the corresponding $CO_2$ concentration time series feature vector.

17. A system for guiding passengers in a subway car based on environmental monitoring and lighting guidance, comprising:

a real-time data obtaining unit, configured to obtain the environmental data sample at each sample collection point of the subway car during each sampling period in real time, the environmental data sample being constituted by installation coordinates of each sample collection point, the temperature time series, the humidity time series, and the $CO_2$ concentration time series corresponding to the sample collection point, and the average temperature value and the average humidity value;

a prediction unit, configured to input the environmental data sample into the distribution prediction model for a corresponding car which is trained by the training method according to claim 1, to obtain a predicted passenger distribution code for the subway car during the corresponding sampling period in real time; and an adjustment and guidance unit, configured to adjust a brightness of lighting tubes in the corresponding car according to the predicted passenger distribution code for the subway car during the corresponding sampling period to guide passenger flow.

18. The system for guiding passengers in the subway car according to claim 17, wherein the adjustment and guidance unit is specifically configured to:

obtain a category of a current image clustering result according to the predicted passenger distribution code for the subway car during the corresponding sampling period, and determine a clustering center corresponding to the current image according to the current image clustering result;

define S binary images closest to the clustering center as typical clustering images of the category of the current image clustering result, and calculate an average pixel value of each pixel position in the S typical clustering images, to obtain an average pixel image under the category of the current image clustering result;

assign each lighting tube to a lighting area according to a layout of lighting tubes in the corresponding car, and calculate an average value of pixel values for pixels in the lighting area corresponding to each lighting tube;

if the maximum pixel value in the average pixel image is greater than a pixel threshold, start lighting guidance and extract pixels in the average pixel image whose average pixel values are greater than the pixel threshold, otherwise skip lighting guidance;

wherein the extracted pixels greater than the pixel threshold constitute a set of pixels to be guided calculate a lighting guidance coefficient according to the coordinates of the lighting tubes in the spatial coordinate system, the coordinates of pixels in the set of pixels to be guided in the spatial coordinate system, and the average value of pixel values for the pixels in the lighting area, wherein the specific calculation expression is:

$$\beta_n = A_n \left| \begin{array}{c} \sqrt{(x_0^n - x_1^l)^2 + (y_0^n - y_1^w)^2} + \sqrt{(x_0^n - x_2^l)^2 + (y_0^n - y_1^w)^2} + \ldots \\ \ldots + \sqrt{(x_0^n - x_H^l)^2 + (y_0^n - y_H^w)^2} \end{array} \right|$$

where, $\beta_n$ is the lighting guidance coefficient, $A_n$ is the average value of pixel values for pixels in the lighting area corresponding to the $n^{th}$ lighting tube, $(x_0^n, y_0^n)$ are the coordinates of the $n^{th}$ lighting tube in the spatial coordinate system, $(x_1^l, y_1^w)$ are the coordinates of the first pixel in the set of pixels to be guided in the spatial coordinate system, $(x_2^l, y_2^w)$ are the coordinates of the second pixel in the set of pixels to be guided in the spatial coordinate system, $(x_H^l, y_H^w)$ are the coordinates of the $H^{th}$ pixel in the set of pixels to be guided in the spatial coordinate system, and H is a number of pixels in the set of pixels to be guided; and adjust the brightness of the lighting tubes in the lighting areas corresponding to the $\beta_n$ values according to the order of the $\beta_n$ values, and guide passengers to flow toward the lighting area with a smaller $\beta_n$ value.

19. A method for guiding passengers in a subway car based on environmental monitoring and lighting guidance, comprising:

obtaining the environmental data sample at each sample collection point of the subway car during each sampling period in real time, the environmental data sample being constituted by installation coordinates of each sample collection point, the temperature time series, the humidity time series, and the $CO_2$ concentration time series corresponding to the sample collection point, and the average temperature value and the average humidity value;

inputting the environmental data samples into the distribution prediction model for the subway car which is trained by the training method according to claim 1, to obtain a predicted passenger distribution code for the subway car during the corresponding sampling period; and adjusting a brightness of lighting tubes in a corresponding car according to the predicted passenger distribution code for the subway car during the corresponding sampling period to guide passenger flow.

20. The method for guiding passengers in the subway car according to claim 19, wherein the specific process of controlling the brightness of lighting tubes in the corresponding car according to the predicted passenger distribution code for the subway car during the corresponding sampling period is as follows:

obtaining a category of a current image clustering result according to the predicted passenger distribution code for the subway car during the corresponding sampling period, and determining a clustering center corresponding to the current image according to the current image clustering result;

defining S binary images closest to the clustering center as typical clustering images of the category of the current image clustering result, and calculating an average pixel value of each pixel position in the S typical clustering images, to obtain an average pixel image under the category of the current image clustering result;

assigning each lighting tube to a lighting area according to the layout of lighting tubes in the corresponding car, and calculating an average value of pixel values for pixels in the lighting area corresponding to each lighting tube;

if a maximum pixel value in the average pixel image is greater than a pixel threshold, starting lighting guidance and extracting pixels in the average pixel image whose average pixel values are greater than the pixel threshold, otherwise skipping lighting guidance; wherein the pixels greater than the pixel threshold constitute a set of pixels to be guided;

calculating a lighting guidance coefficient according to the coordinates of the lighting tubes in the spatial coordinate system, the coordinates of pixels in the set of pixels to be guided in the spatial coordinate system, and the average value of pixel values for the pixels in the lighting area, wherein the specific calculation expression is:

$$\beta_n = A_n \left( \frac{\sqrt{(x_0^n - x_1^l)^2 + (y_0^n - y_1^w)^2} + \sqrt{(x_0^n - x_2^l)^2 + (y_0^n - y_1^w)^2} + \ldots}{\ldots + \sqrt{(x_0^n - x_H^l)^2 + (y_0^n - y_H^w)^2}} \right)$$

where, $\beta_n$ is the lighting guidance coefficient, $A_n$ is the average value of pixel values for pixels in the lighting area corresponding to the $n^{th}$ lighting tube, $(x_0^n, y_0^n)$ are coordinates of the $n^{th}$ lighting tube in the spatial coordinate system, $(x_1^l, y_1^w)$; are coordinates of the first pixel in the set of pixels to be guided in the spatial coordinate system, $(x_2^l, y_2^w)$ are coordinates of the second pixel in the set of pixels to be guided in the spatial coordinate system, $(x_H^l, y_H^w)$ are coordinates of the $H^{th}$ pixel in the set of pixels to be guided in the spatial coordinate system, and H is a number of pixels in the set of pixels to be guided; and adjusting the brightness of the lighting tubes in the lighting areas corresponding to the $\beta_n$ values according to the order of the $\beta_n$ values, and guiding passengers to flow toward the lighting area with a smaller $\beta_n$ value.

21. A training system for a distribution prediction model of passengers in a subway car, comprising a plurality of training subsystems, each subway car corresponding to a training subsystem, wherein each training subsystem comprises a plurality of collection devices arranged on the roof of the subway car and a control device; the collection device comprises temperature and humidity sensors and a $CO_2$ concentration sensor;

the control device comprises:

a coordinate system establishment unit, configured to establish a spatial coordinate system of the subway car, and obtain installation coordinates of each sample collection point in the corresponding spatial coordinate system, each collection device serving as a sample collection point;

an environmental data obtaining unit, configured to obtain a temperature time series, a humidity time series, and a $CO_2$ concentration time series at each sample collection point of the subway car during a sampling period, and obtain an average temperature value and an average humidity value locally of a day, wherein the installation coordinates of each sample collection point, the temperature time series, the humidity time series, and the $CO_2$ concentration time series corresponding to the sample collection point, and the average temperature value and the average humidity value constitute an environmental data sample at each sample collection point of the subway car during the sampling period;

a passenger distribution obtaining unit, configured to obtain coordinates of passengers in the corresponding spatial coordinate system according to recorded passenger positions in the subway car at the end time of the sampling period, so as to obtain a passenger distribution for the subway car during the sampling period;

an image conversion and feature extraction unit, configured to convert the passenger distribution for the subway car during the sampling period into a binary image, and calculate a mean value, a variance, a maximum value and a minimum value of pixels in the binary image;

calculate an amplitude and a gradient direction of each pixel in the binary image, and establish a frequency distribution histogram with a gradient direction of all pixels as an abscissa axis and a pixel value corresponding to each pixel as an ordinate axis; and extract a frequency distribution feature of the frequency distribution histogram, the frequency distribution feature referring to a feature vector constituted by pixel values corresponding to each interval among R intervals equally divided from the abscissa axis of the frequency distribution histogram;

a clustering classification unit, configured to combine the mean value, the maximum value, the minimum value, the variance and the frequency distribution feature of the pixels in the binary image to form an original feature vector associated with the binary image, and cluster the binary images for multiple sampling periods with the associated original feature vectors as input of a clustering algorithm to obtain image clustering results;

a coding unit, configured to code a passenger distribution mode according to the image clustering results to obtain a passenger distribution code, each category of image clustering result corresponding to one passenger distribution mode, and each passenger distribution mode corresponding to one passenger distribution code; and a model training unit, configured to establish a distribution prediction model in the subway car, and train the distribution prediction model with training samples to obtain a trained distribution prediction model, the training sample taking the environmental data sample of each sample collection point of the subway car during the sampling period as input and the corresponding passenger distribution code as output.

* * * * *